United States Patent Office 3,392,160
Patented July 9, 1968

3,392,160
COCATALYST COMPOSITIONS
Adam Orzechowski, Waltham, Mass., assignor to Cabot Corporation, Boston, Mass., a corporation of Delaware
No Drawing. Continuation-in-part of application Ser. No. 305,515, Aug. 29, 1963. This application Feb. 7, 1964, Ser. No. 343,204
The portion of the term of the patent subsequent to Jan. 18, 1982, has been disclaimed
19 Claims. (Cl. 260—94.3)

ABSTRACT OF THE DISCLOSURE

The present invention provides novel catalysts for the polymerization and copolymerization of olefinic monomers. The catalyst is generally characterized as comprising the product of reaction between (1) the product of reaction between a Group IVa, Va or VIa transition metal amine, and a finely-divided particulate solid bearing hydroxyl groups on the surface thereof, and (2) various organometallic activators. The olefin monomer is polymerized by contacting thereof with said catalyst under various conditions.

---

Accordingly, it is a principal object of the present invention to provide new and useful catalyst components.

It is another object of the present invention to provide a novel polymerization process.

It is still another object of the present invention to provide novel polymerization catalysts.

Other objects of the present invention will in part be obvious and will in part appear hereinafter.

This application is a continuation in part of copending U.S. application, Ser. No. 305,515, filed Aug. 29, 1963, now abandoned, and U.S. application Ser. No. 86,868, filed Feb. 3, 1961, now U.S. 3,166,542.

In accordance with the present invention, mono- and di-olefins are polymerized or copolymerized by a catalyst comprising (a) the product of the reaction carried out under certain conditions between certain amine compounds of Groups IVa, Va and VIa metals and hydroxyl groups on the surface of a finely-divided particulate solid and (b) an organometallic compound. The polymerization or copolymerization reaction can be effected at suitable temperatures within the range of from about −25° C. to about 250° C., and pressures from below atmospheric upwardly to any desired maximum pressure, for example, 30,000 p.s.i.g. or even higher pressures.

Solids suitable for the purposes of the present invention generally include any compound which is available in finely-divided particulate form with hydroxyl groups on the surface thereof. For example, oxides such as silica, alumina, zirconia, thoria and magnesia, silicates such as chrysotile, actinolite and crocidolite, aluminates such as corundum and bauxite and carbon black such as channel black are all generally suitable for purposes of the present invention. It should be noted that the ultimate efficiency of the catalyst components produced in accordance with the present invention is generally highly dependent upon the number of surface hydroxyl groups present per gram of finely-divided solid. Accordingly, in preparing the transition metallated finely-divided solids of the present invention, it should be kept in mind that the smaller the average particle size of the solid and the larger the quantity of hydroxyl groups on the surface thereof, the greater will be the potential activity and efficiency of the catalyst component producible therefrom. Therefore, it is important to use as the starting material particulate, finely-divided solids having an average particle diameter of less than about 1 micron, and preferably less than about 0.1 micron, and a surface hydroxyl group concentration of at least about $1 \times 10^{-4}$, and preferably of at least about $5 \times 10^{-4}$, equivalents per gram.

Amine compounds of Groups IVa, Va and VIa metals, hereinafter referred to as transition metal compounds, suitable for the purposes of the present invention are those compounds conforming to the empirical formula $$X_a T(NR_2)_q$$

wherein each X is any halogen; $a$ is a number from 0 to 3; T is a metal of Group IVa, Va and VIa (Mendeleev Periodic System); each N is nitrogen; each R is hydrogen or any hydrocarbon radical of from about 1 to 8 carbon atoms in length; $q$ is a number from 1 to 6.

Specific examples of R groups for substitution in the above formula include methyl, ethyl, propyl, isobutyl, 2-ethylcyclohexyl, 1-methylpentyl; 2,3-dimethylbutyl; methylethyl; octyl; 2-methyl-2-butyl and 1 methylheptyl.

Specific examples of compounds conforming to the formula $$X_a T(NR_2)_q$$

which are suitable for the purposes of the present invention are tetrakisdiethylaminotitanium-Ti[N(C₂H₅)₂]₄; tetrakisdipentylaminotitanium - Ti[N(C₅H₁₁)₂]₄; tetrakisdimethylaminozirconium - Zr[N(CH₃)₂]₄; trisdiethylamino (mono)dimethylaminotitanium-

[(C₂H₅)₂N]₃Ti[N(CH₃)₂]

tetrakismethylpropylaminozirconium-

Zr[N(CH₃)(C₃H₇)]₄ trisdipentylamino(mono)methylethylaminovanadium-

[N(C₅H₁₁)₂]₃V[N(CH₃)(C₂H₅)]

pentakisdibutylaminoniobium-Nb[N(C₄H₉)₂]₅; dichlorodibutylaminotitanium-[(C₄H₉)₂N]₂TiCl₂; bromotrisdipentylaminozirconium-[(C₅H₁₁)₂N]₃ZrBr; tetrakisdiethylaminochromium-Cr[N(C₂H₅)₂]₄; and the like.

The conditions under which reaction between the transition metal compound and the finely-divided solid can be accomplished are subject to considerable variation. However, in order to obtain a catalyst component with exceptionally high activity and reproducible character and performance it has been found to be all important that the finely-divided solid be essentially dry and anhydrous (i.e. free of molecular water in any form) at the time it is brought into contact with the transition metal compound. In addition, it is recommended that reaction of the solid and the transition metal compound be accomplished so as to allow by-products of the reaction to be eliminated from the reaction zone in order to thereby insure that said reaction goes to completion. Generally, the said reaction can be carried out by contacting said solid with said transition metal compound, preferably in a solution thereof in an inert hydrocarbon medium, and maintaining the two reactants in intimate contact for a period of time sufficient to effect the desired chemical reaction resulting in the chemical bonding of the transition metal to an oxygen atom(s) in the surface of the solid.

Elimination of the by-products of the reaction from the reaction zone, i.e. from the reaction medium, can be accomplished in any convenient manner such as, by sweeping the reaction vessel with an inert gas, by carrying out the reaction at sufficiently elevated temperatures while stirring to drive off by-products, and by complexing or reacting said by-products with suitable substances.

Generally speaking, almost any temperature between about 0° C. and about 300° C. and even higher temperatures can be used satisfactorily, providing that the decomposition temperatures of the compounds utilized is not exceeded, but 25° C. to about 125° C. is generally preferred. Assuming provision is made for intimate contact of the dry solid and the transition metal compound, the minimum time required to accomplish the chemical reaction will vary from periods of the order of about 10 hours at 0° C. to periods of the order of about 30 minutes at temperatures of 100° C. or over. Temperatures substantially higher than about 300° C., are generally completely needless and therefore of little or no interest.

Of course, the reaction can also be carried out by other means, such as by exposing the solid to the vapors of the transition metal compound, provided, of course, that said solid is exposed to sufficient quantities of the vapors of said compound under conditions of time and temperature that will foster reaction. Said vapors can be supplied under their own vapor pressures using partial vacuum if necessary, or with the aid of a dry, inert carrier gas such as nitrogen. This vapor phase treatment can be accomplished in any suitable manner such as by circulating the vapors through the particulate solid in a fixed or moving bed reactor.

It is believed, though there is no intention to be bound by this explanation, that the type of reaction that occurs is correctly illustrated by the following illustrative equations, wherein silica represents the finely-divided solids and tetrakisdimethylaminotitanium represents the transition metal compounds:

Equation 1

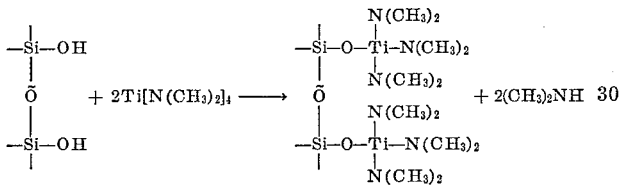

Equation 1a

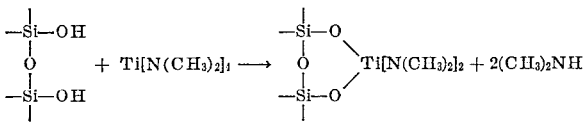

Organometallic compounds suitable for the purposes of the present invention are the compounds chosen from the group consisting of (a) compounds conforming to the empirical formula

wherein M is a metal chosen from Groups I, II and III of the periodic table; M' is a metal of Group I of the periodic table; $v$ is a number from 0 to 1; each X is any halogen; $n$ is a number from 0 to 3; each R' is any monovalent hydrocarbon radical or hydrogen; $y$ is a number from 1 to 4; and wherein $y-n$ equals at least one; and (b) compounds conforming to the empirical formula

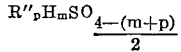

wherein each R" is chosen from the group consisting of monovalent hydrocarbon radicals, monovalent alkoxy radicals, monovalent aryloxy radicals, and the halogens; $p$ is a number from 0 to 3; each H is a hydride radical; $m$ is a number from 1 to 4; S is chosen from the group consisting of quadrivalent silicon, germanium, tin and lead; and O is oxygen.

Specific examples of R" groups for substitution in the above formula include methyl; 2-methyl-2-butenyl; n-dodecyl; 4 cyclohexylethyl; methylnaphthylethyl; 2,2,1-bicycloheptyl; tolyl; xylyl; xenyl; methoxy; isobutoxy; n-octyloxy; phenoxy and 1,2-naphthoxy.

Specific examples of compounds conforming to the formula

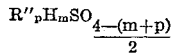

are silane-$SiH_4$; ethylsilane-$H_3SiC_2H_5$; diethylmonochloro- silane-$HSiCl(C_2H_5)_2$; dichlorosilane-$H_2SiCl_2$; methyldiethylsilane-$HSi(C_2H_5)_2CH_3$;

trimethoxysilane-$HSi(OCH_3)_3$ tribenzylsilane-$HSi(CH_2C_6H_5)_3$; dicyclohexylphenylsilane-$HSiC_6H_5(C_6H_{11})_2$; triphenoxysilane-$HSi(OC_6H_5)_3$; triphenylgermane-$(C_6H_5)_3GeH$;

tricyclohexylgermane-$(C_6H_{11})_3GeH$ tribenzylgermane - $(C_6H_5CH_2)_3GeH$; ethylisoamylgermane-$(C_2H_5)(i-C_5H_{11})GeH_2$ dibutylstannane-$(C_4H_9)_2SnH_2$ di-isopropylstannane - $(i-C_3H_7)_2SnH_2$; tripentylstannane-$(C_5H_{11})_3SnH$; n-butylgermane - $n-C_4H_9GeH_3$; triphenylplumbane-$(C_6H_5)_3PbH$; triethoxystannane-$(C_2H_5O)_3SnH$; 1,2-dihydrotetramethylstannoxane- $(CH_3)_2HSnOSnH(CH_3)_2$;

cyclic alkyl hydrogen silicones such as $(CH_3HSiO)_6$; and linear alkyl hydrogen silicones such as $(CH_3)_2HSiOSiH(CH_3)_2$ Organometallic compounds which conform to the formula

and which are suitable for the practice of the invention include compounds conforming to the subgeneric formula

wherein M is a Group I, II or III metal, such as sodium, beryllium, boron, aluminum and gallium; wherein $k$ is a number from 1 to 3 depending upon the valency of M; and wherein each R' is hydrogen or any monovalent hydrocarbon radical. Examples of suitable hydrocarbon radicals include aryl or alkaryl radicals, aliphatic hydrocarbon radicals, or derivatives, such as alkyl, cycloalkenylalkyl, arylalkyl, alkylcycloalkyl and cycloalkylalkenyl.

Specific examples of R' groups for substitution in the above formula include methyl, isobutyl, hexyl, n-dodecyl, 2-methyl-2-butenyl, 4-bicycloheptyl, dimethylcyclohexyl, 5-cyclopentadienyl, phenylcyclohexyl, tolyl, xylyl, xenyl, and dimethylnaphthyl.

Specific compounds conforming to the empirical formula

and which are therefore suitable for the purposes of the present invention are organo compounds such as butyllithium, di-p-tolylmercury, tri-n-amylboron, triisobutylaluminum, diisobutylaluminum bromide, phenylmercuric iodide, hexylcupric chloride, octylmagnesium hydride, triethyllithium aluminum bromide and sodiumdiphenyllithium. Definitely preferred, however, are the aluminum alkyls such as aluminum triisobutyl.

Further specific examples of suitable organometallic compounds conforming to the formula

can be found in copending U.S. application, Ser. No. 278,414 filed May 6, 1963, by Orzechowski and MacKenzie.

It is pointed out that catalysts formed with the organometallic compounds of the present invention conforming to the formula

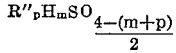

such as the silanes, for example, often require activation by heating, in the case of the silanes to temperatures above about 100° C. and preferably above about 130° C. for at least about 1 hour. At higher temperatures, shorter periods of time are required. At substantially lower temperatures, the catalyst is either not formed at all or is of inferior quality. The temperatures that need be utilized in activating the catalyst with any particular combination of components can be readily determined bearing in mind that temperatures (or pressures) that cause substantial decomposition of either of the components of the catalyst should be avoided.

Although it is appreciated that when R' or R'' in the above empirical formulae do not comprise at least one hydrocarbon radical, the resulting compounds cannot normally be termed organometallic compounds, compounds lacking at least one hydrocarbon radical comprise such a relatively small number of compounds included by said general formulae that for the purposes of the present invention, it is intended that these compounds be included within the generic term, organometallic compound. Accordingly, in the present specification and claims, it is intended, and therefore, it should be understood, that the term, organometallic compound, refers to all the compounds included within the scope of the above defined general formulae. In addition, it is pointed out that while, strictly speaking, silicon and germanium are not metals, it is intended, and therefore it should be understood, that for the purposes of the present specification and claims, silicon and germanium are metals and the term organometallic includes within its scope, silicon and germanium compounds within the scope of the above formula,

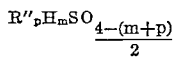

Using the catalysts of this invention, polymerization and copolymerization of olefinic monomers can often be accomplished in the absence of liquids other than the monomers themselves, solvents or diluents, for example, in the gas phase, but it is usually more convenient to effect polymerization in the presence of a substantially inert liquid reaction medium. Accordingly, an inert liquid reaction medium is preferably supplied to the reaction zone.

Several classes of hydrocarbons or their mixtures which are liquid and substantially inert under the polymerization conditions of the present process constitute suitable liquid reaction media. Thus, various classes of saturated hydrocarbons such as pure alkanes or cycloalkanes or commercially available mixtures, freed of harmful impurities, are suitable for the purposes of the present invention. For example, straight run naphthas or keroseneses containing alkanes and cycloalkanes and liquid or liquefied alkanes such as n-hexane, 2,3-dimethylbutane, n-dodecane, dimethylcyclopentane, methyldecalins, and the like are suitable. Also, members of the aromatic hydrocarbon series, such as isopropyl benzene, ethyltoluene, hemimellitene, pseudocumene, isodurene, isoamylbenzene, and particularly the mono-nuclear aromatic hydrocarbons such as xylenes, mesitylene and xylene-p-cymene mixtures, and the like are completely suitable.

The proportion of transition metallated finely-divided solid to organometallic compound utilized in preparing the finished catalyst is not usually a critical feature of the process. Moreover, if this proportion is expressed as a simple molar or weight ratio, it may not be particularly meaningful because as indicated above, the efficiency of said surface reacted solids (on a weight or molar bases) is highly dependent upon the proportion of transition metal having amine radicals attached thereto which is chemically attached to the surface of the solids. Accordingly, in order to be most meaningful, the relationship between amounts of the two components of the finished catalyst should be expressed as some function of the amount of transition metal, which is chemically attached to the surface of the finely-divided solid. We have found from experience that an atomic ratio of from 0.1 to 10 and preferably 0.3 to 5 of the organometallic compound to transition metal chemically attached to the surface of the finely-divided solid is desirable.

The quantity of catalyst, i.e., comprising both the surface reacted finely-divided solid and the organometallic compound to be utilized in the polymerization reaction may vary, the precise quantity selected for use being dependent upon the desired rate of polymerization, the geometry of the reaction zone, the composition of the particular olefinic charging stock, temperature and other reaction variables. It should be pointed out that in general the efficiency of the catalysts of the present invention is of a high order and accordingly, the total quantity of catalyst that need be employed based on the weight of the charging stock is small particularly when a very fine particle size metal or metalloid oxide (preferably pyrogenic) has been utilized as the finely-divided solid.

Harmful impurities in the liquid hydrocarbon reaction medium can be effectively neutralized prior to the formation therein, or addition thereto, of the catalyst or catalyst components of this invention by treating the liquid medium with a metal alkyl or a transition metal compound. The olefinic charging stocks can also be purified by any known means such as bubbling said stocks through a solution of a metal alkyl in a hydrocarbon solvent prior to their introduction into the polymerization reactor.

Temperature control during the course of the polymerization process can be readily accomplished when a liquid hydrocarbon diluent is utilized because of the presence in the reaction zone of a large liquid mass having relatively high heat capacity. The liquid hydrocarbon reaction medium can, in turn, be cooled by indirect heat exchange with a suitable coolant inside or outside the reaction zone.

The contact time or space velocity employed in the polymerization process will be selected with reference to the other process variables such as the particular catalysts utilized, the specific type of product desired, and the extent of monomer conversion desired in any given run or pass over the catalyst. In general, this variable is readily adjustable to obtain the desired results.

There follow a number of illustrative non-limiting examples:

Example 1

To a 2000 milliliter, glass, three neck reaction flask equipped with a stirrer and condenser there is charged 20 grams of "Cab-O-Sil," a pyrogenic silica produced by Cabot Corporation, and which has an average particle diameter of about 10 millimicrons and a hydroxyl group content on the surface thereof about 1.5 milliequivalents per gram. Next, there is added to said vessel 1650 milliliters of ethylbenzene and the resulting slurry is dried by being heated to, and maintained at, the boiling point of ethylbenzene, i.e. about 137° C., for about 24 hours while a water/ethylbenzene azeotrope is removed from the reaction vessel by periodic distillation until 450 milliliters of distillate has been removed. The vessel is then cooled and charged with 20 millimoles of tetrakisdi-n-propylaminotitanium; Ti[N(n—C₃H₇)₂]₄. The resulting slurry is then heated to, and maintained at, refluxing temperature for about 16 hours with continuous stirring while being swept by a stream of dry nitrogen. Subsequently, the extent of the reaction between the tetrakisdi-n-propylaminotitanium and hydroxyl groups on the surface of the silica is determined by measuring the quantity of di-n-propylamine that was produced and by testing the liquid content of the vessel for the absence therein of tetrakisdi-n-propylaminotitanium, and the said silica is found to have 20 milliatoms of titanium bound to the surface thereof. 180 milliliters of this slurry containing about 3 millimoles of titanium chemically bound to the surface of about 3 grams of silica, is then transferred from this reaction vessel to a 500 cc. stainless steel bomb which has been previously flushed with dry nitrogen. Next, said bomb is charged with 9 millimoles of triisobutylaluminum followed by pressurization to 200 p.s.i. with ethylene. The bomb is then heated to and maintained at, about 80° C. for 6 hours with continuous agitation, while a pressure of about 200 p.s.i. is maintained therein by the periodic addition of ethylene. Subsequently, the solid reaction products are analyzed and it is found that solid polyethylene has been produced.

Example 2

To a 2000 milliliter, three neck, glass reaction vessel there is added 20 grams of "Alon," a pyrogenic alumina produced by Deutsche Gold- und Silber-Scheideanstalt vormals Roessler, and which has an average particle diameter of about 10–40 millimicrons and a hydroxyl group content on the surface thereof of about 0.7 milliequivalents per gram. Next, there is added to said vessel 1500 milliliters of n-hexane and the resulting slurry is dried azeotropically for 20 hours until about 500 milliliters of a water/n-hexane azeotrope have been removed. The vessel is then cooled to ambient temperature and charged with 9 millimoles of tetrakisdimethylaminozirconium—$Zr[N(CH_3)_2]_4$ The resulting slurry is then refluxed at about 80° C for about 46 hours with continuous stirring while being swept by a stream of dry nitrogen. Subsequently, the extent of reaction between the tetrakisdimethylaminozirconium and the hydroxyl grousp on the surface of the alumina is determined by measuring the quantity of dimethylamine that was produced and by testing the liquid contents of the vessel for the absence therein of tetrakisdimethylaminozirconium, and the said alumina is found to have 9 milliatoms of zirconium chemically bound to the surface thereof. A 333 milliliter portion of this slurry containing about 3 milliatoms of zirconium bound to the surface of about 6.7 grams of alumina is then transferred, without exposure to the atmosphere, to a 1000 milliliter stainless steel, reaction bomb. There is then charged to said bomb 25 millimoles of triethylsilane previously dissolved in 100 milliliters of anhydrous benzene. The bomb is then sealed, heated to and maintained at about 155° C. and continuously agitated for about 8 hours. Next, there is charged to said bomb 400 millimoles of isoprene monomer. Said bomb is then continuously stirred at a temperature of about 80° C. for 4 hours. The reaction products are analyzed and it is found that solid polyisoprene has been formed.

Example 3

To a 2000 milliliter, three neck, glass reaction vessel there is added 20 grams of "Supercarbovar," a channel carbon black produced by Cabot Corporation, which has an average particle diameter of 14 millimicrons and a hydroxyl group content on the surface thereof of about 1.6 milliequivalents per gram. To said reaction vessel there is added 1700 milliliters of benzene, and the resulting slurry is dried by being heated to, and maintained at, the refluxing point of benzene, i.e. about 80° C., for about 20 hours, while a water/benzene azeotrope is removed from the reaction vessel by periodic distillation until about 450 milliliters of distillate has been removed. The vessel is then cooled and charged with 20 millimoles of tetrakisdiethylaminozirconium—$Zr[N(C_2H_5)_2]_4$ The resulting slurry is then refluxed for about 6 hours with continuous stirring while being swept by a stream of dry nitrogen. Subsequently, the extent of the reaction between the tetrakisdiethylaminozirconium and the hydroxyl groups on the surface of the carbon black is determined by measuring the quantity of diethylamine that is produced and by testing the liquid contents of the vessel for the absence therein of tetrakisdiethylaminozirconium, and said slurry is found to contain 20 milliatoms of zirconium chemically bound to the surface of said barbon black.

125 milliliters of this slurry containing about 2 milliatoms of zirconium bound to the surface of about 2 grams of carbon black is then charged to a 500 milliliter stainless steel reaction bomb. Next, there is charged to said bomb about 4 millimoles of triethylstannane and the bomb is then sealed and agitated at a temperature of about 80° C. for about two hours. Thereafter, after cooling to about 0° C., there is introduced into the bomb 50 millimoles of 1,3-butadiene and 50 millimoles of ethylene. The bomb is then heated to, and maintained at, about 80° C. with continuous agitation for about 8 hours. Subsequent analysis of the solid product reveals that an ethylenebutadiene copolymer has been produced.

It is also found that other carbon blacks having a similar hydroxyl group concentration on the surface thereof yield similar results.

The polymers produced by the catalysts of the present invention can be subjected to such aftertreatment as may be desired to fit them for particular uses or to impart desired properties. Thus, the polymers can be extruded, mechanically milled, filmed or cast, or converted to sponges or latices. Also, antioxidants, stabilizers, fillers such as carbon black, silicas, extenders, plasticizers, pigments, insecticides, fungicides, etc., can be incorporated into the polymers.

Obviously, many changes can be made in the above described examples and procedures without departing from the scope of the invention. For example, although only titanium and zirconium compounds are utilized in the above examples, other compounds such as vanadium compounds are also suitable for the purposes of the present invention. For example, pentakisdi-i-propylaminoniobium—$Nb[N(i-C_3H_7)_2]_5$ and tetrakisdiethylaminochromium—$Cr[N(C_2H_5)_2]_4$ are entirely suitable.

Also, pyrogenically coformed, or coprecipitated metal oxides, or metal oxides coformed with, or mixed with, other compounds are suitable for the purposes of the present invention when the particle size and surface hydroxyl group concentration thereof is within the limits set forth hereinbefore.

Accordingly, it is intended that the above disclosure be regarded as illustrative and as in no way limiting the scope of the invention.

What I claim is:

1. A catalyst component comprising a finely-divided solid carrying in chemical combination surface structures conforming to the formula $$X_aT(NR_2)_q$$

wherein each X is any halogen; $a$ is a number from 0 to 3; T is a metal chosen from the group consisting of Groups IVa, Va and VIa; each N is nitrogen; each R is hydrogen or a hydrocarbon radical of from 1 to 8 carbon atoms in length; and $q$ is a number from 1 to 5; and wherein said structures are chemically linked directly from T to at least one oxygen atom in the surface of said solid.

2. The catalyst component of claim 1 wherein T is a metal of Group IVa.

3. The catalyst component of claim 1 wherein T is titanium.

4. The catalyst component of claim 1 wherein T is zirconium.

5. The catalyst component of claim 1 wherein T is a metal of Group Va.

6. The catalyst component of claim 1 wherein T is vanadium.

7. The catalyst component of claim 1 wherein T is a metal of Group VIa.

8. The catalyst component of claim 1 wherein T is chromium.

9. The catalyst component of claim 1 wherein in said formula, $a$ is 0.

10. The catalyst component of claim 1 wherein said solid is a metal oxide having an average particle diameter of less than about 0.1 micron and a concentration of said structures on the surface thereof of at least about $1 \times 10^{-4}$ equivalents per gram.

11. The catalyst component of claim 10 wherein said solid is chosen from the group consisting of silica and alumina.

12. A catalyst which comprises the product of reaction between
(1) a finely-divided solid carrying in chemical combination surface structures conforming to the formula:

$$X_aT(NR_2)_q$$

wherein each X is any halogen; $a$ is a number from 0 to 3; T is a metal chosen from the group consisting of Groups IVa, Va and VIa; each N is nitrogen; each R is hydrogen or a hydrocarbon radical of from 1 to 8 carbon atoms in length; and $q$ is a number from 1 to 5, and where said structures are chemically linked directly from T to at least one oxygen atom on the surface of said solid, and
(2) an organometallic compound chosen from the group consisting of compounds conforming to the general formulae:

$$MM'_vX_nR'_{y-n}$$

where M is a metal chosen from Groups I, II and III of the periodic table; M' is a metal of Group I of the periodic table; $v$ is a number from 0 to 1; each X is any halogen; $n$ is a number from 0 to 3; each R' is chosen from the group consisting of any monovalent hydrocarbon radical and hydrogen; $y$ is a number from 1 to 4; and wherein $y-n$ equals at least one; and compounds conforming to the formula:

$$\frac{R''_pH_mSO_{4-(m+p)}}{2}$$

wherein each R'' is chosen from the group consisting of any monovalent hydrocarbon radical, monovalent alkoxy radical, monovalent aryloxy radical, and the halogens; $p$ is a number from 0 to 3; each H is hydrogen; $m$ is number from 1 to 4; S is chosen from the group consisting of a quadrivalent metal of IVb; and O is oxygen.

13. The catalyst of claim 12 wherein said organometallic compound conforms to the formula $$\frac{R''_pH_mSO_{4-(m+p)}}{2}$$

14. The catalyst of claim 12 wherein in the formula $$\frac{R''_pH_mSO_{4-(m+p)}}{2}$$

S is silicon.

15. The catalyst of claim 12 wherein said organometallic compound conforms to the formula $$MM'_vX_nR'_{y-n}$$

16. The catalyst of claim 12 wherein said organometallic compound is an aluminum alkyl.

17. A process for polymerizing a substance chosen from the group consisting of a mono-olefin, mixtures of mono-olefins, a di-olefin, mixtures of di-olefins and mixtures thereof which comprises contacting said substance at temperatures between about —25° C. and 250° C., with a catalyst comprising
(a) a finely-divided solid carrying in chemical combination surface structures conforming to the formula:

$$X_aT(NR_2)_q$$

wherein each X is any halogen; $a$ is a number from 0 to 3; T is a metal chosen from the group consisting of Groups IVa, Va and VIa; each N is nitrogen; each R is hydrogen or a hydrocarbon radical of from 1 to 8 carbon atoms in length; and $q$ is a number from 1 to 5, and wherein said structures are chemically linked directly from T to at least one oxygen atom in the surface of said solid, and
(b) an organometallic compound chosen from the group of compounds conforming to the general formulae:

$$MM'_vX_nR'_{y-n}$$

wherein M is chosen from the group consisting of the metals of Groups I, II and III; M' is a metal of Group I; $v$ is a number from 0 to 1; each X is any halogen; $n$ is a number from 0 to 3; each R' is chosen from the group consisting of any monovalent hydrocarbon radical and hydrogen; $y$ is a number from 1 to 4; and wherein $y-n$ is at least one, and $$\frac{R''_pH_mSO_{4-(m+p)}}{2}$$

wherein each R'' is chosen from the group consisting of any monovalent hydrocarbon radical, monovalent, alkoxy radical, monovalent aryloxy radical and the hologens; $p$ is a number from 0 to 3; each H is hydrogen; $m$ is a number from 1 to 4; S is chosen from the group consisting of quadrivalent metals of Group IVb; and O is oxygen.

18. The process of claim 16 wherein the substance to be polymerized is an alpha-mono-olefin.

19. The process of claim 16 wherein the substance to be polymerized is a di-olefin which has a double bond in the alpha position.

References Cited

UNITED STATES PATENTS

| | | | |
|---|---|---|---|
| 3,166,542 | 1/1965 | Orzechowski et al. | 260—94.9 |
| 3,166,543 | 1/1965 | Orzechowski et al. | 260—94.9 |
| 3,196,137 | 7/1965 | Cain | 260—94.9 |

OTHER REFERENCES

Perry: Die Makromolekulare Chemie, 65, 145–156 (1963).

JOSEPH L. SCHOFER, *Primary Examiner.*

W. HOOVER, R. A. GAITHER, *Assistant Examiners.*

UNITED STATES PATENT OFFICE
CERTIFICATE OF CORRECTION

Patent No. 3,392,160

July 9, 1968

Adam Orzechowski et al.

It is certified that error appears in the above identified patent and that said Letters Patent are hereby corrected as shown below:

In the heading to the printed specification, line 3, "Adam Orzechowski, Waltham, Mass., assignor to" should read -- Adam Orzechowski, Waltham, Mass., and James C. MacKenzie, Rochester, N. Y., assignors to --.

Signed and sealed this 2nd day of December 1969.

(SEAL)
Attest:

Edward M. Fletcher, Jr.
Attesting Officer

WILLIAM E. SCHUYLER, JR.
Commissioner of Patents